United States Patent
Muhammad et al.

(10) Patent No.: US 10,974,675 B2
(45) Date of Patent: Apr. 13, 2021

(54) ADVANCED PEDESTRIAN SENSING SYSTEM FOR VEHICLES WITH ACTIVE HOOD

(71) Applicant: GM Global Technology Operations LLC, Detroit, MI (US)

(72) Inventors: Hanif Muhammad, Ann Arbor, MI (US); Dorel M. Sala, Troy, MI (US); Richard J. Skurkis, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 16/003,496

(22) Filed: Jun. 8, 2018

(65) Prior Publication Data

US 2019/0375359 A1    Dec. 12, 2019

(51) Int. Cl.
| | |
|---|---|
| *B60R 21/0136* | (2006.01) |
| *B60R 21/0132* | (2006.01) |
| *B60R 21/38* | (2011.01) |
| *G01L 5/00* | (2006.01) |
| *G01L 1/16* | (2006.01) |
| *B60R 21/01* | (2006.01) |
| *B60R 21/00* | (2006.01) |

(52) U.S. Cl.
CPC ...... *B60R 21/0136* (2013.01); *B60R 21/0132* (2013.01); *B60R 21/38* (2013.01); *G01L 1/16* (2013.01); *G01L 5/0052* (2013.01); *B60R 2021/0048* (2013.01); *B60R 2021/01252* (2013.01)

(58) Field of Classification Search
CPC ........................ B60R 21/0136; B60R 19/483
See application file for complete search history.

(56) References Cited

U.S. PATENT DOCUMENTS

| | | | |
|---|---|---|---|
| 5,216,607 A * | 6/1993 | Diller | B60R 21/0132 280/735 |
| 7,063,377 B2 | 6/2006 | Brei et al. | |
| 7,331,415 B2 * | 2/2008 | Hawes | B60R 21/0136 180/274 |
| 7,455,147 B2 | 11/2008 | Brei et al. | |

(Continued)

FOREIGN PATENT DOCUMENTS

| | | |
|---|---|---|
| DE | 10030465 A1 | 1/2002 |
| DE | 10257125 A1 | 7/2004 |
| DE | 102004006196 A1 | 8/2005 |

*Primary Examiner* — Nicole T Verley

(57) ABSTRACT

A method for operating an automobile vehicle pedestrian sensing system includes: embedding multiple piezoelectric sensors in a vehicle bumper fascia, each generating a voltage in response to an impact of an object with the fascia; retrieving multiple threshold values from a memory, each assigned to one of the sensors; reading the voltage from each of the sensors; grouping individual sensors into multiple different logic circuits, each including at least two of the sensors; determining for each sensor in each of the logic circuits if the voltage is greater than the assigned threshold value; creating a positive signal following any one of the logic circuits when the voltage is determined to be greater than the assigned threshold value for the sensors grouped into the one of the logic circuits; and generating a hood deployment system deployment signal when the positive signal is output from all of the logic circuits.

8 Claims, 8 Drawing Sheets

(56) References Cited

U.S. PATENT DOCUMENTS

| | | | | |
|---|---|---|---|---|
| 7,744,122 B2 * | 6/2010 | Breed | ................... | B60R 21/232 |
| | | | | 280/731 |
| 8,179,254 B2 * | 5/2012 | Hyde | ................... | A41D 13/018 |
| | | | | 180/271 |
| 8,564,423 B2 * | 10/2013 | Nichols | ............... | B60R 21/0136 |
| | | | | 180/274 |
| 8,876,157 B2 * | 11/2014 | Nilsson | ................ | B60R 21/015 |
| | | | | 180/271 |
| 9,254,804 B2 * | 2/2016 | Wanami | ............. | B60R 21/0134 |
| 2005/0154530 A1 * | 7/2005 | Hosokawa | ............ | B60R 21/013 |
| | | | | 701/301 |
| 2009/0312949 A1 * | 12/2009 | Suzuki | ............... | B60R 21/0136 |
| | | | | 701/301 |
| 2010/0030433 A1 * | 2/2010 | Suzuki | ................ | B60R 21/0136 |
| | | | | 701/45 |

* cited by examiner

ADVANCED PEDESTRIAN SENSING SYSTEM FOR VEHICLES WITH ACTIVE HOOD

INTRODUCTION

The present disclosure relates to pedestrian sensing systems for automobile vehicles equipped with active hoods.

Numerous motor vehicles employ a hingeable hood disposed in a region between the passenger compartment and the forward bumper of the motor vehicle, or between the passenger compartment and the rearward bumper of the motor vehicle. The hingeable hood provides a mechanism for accessing the underlying engine or storage compartment. The hingeable hood is typically formed of a relatively thin sheet of metal, plastic or a composite material that is molded to the appropriate contour corresponding to the overall vehicle body design and styling. Owing to the relatively thin nature of the material forming the hingeable hood, a support structure such as a contoured plate with stamped rib supports typically extends across the underside of the hood portion to provide a degree of dimensional stability to the structure and meet consumer metric requirements.

Aerodynamics, styling, thermal and packaging considerations, among others, have all contributed to the overall design of the front end architectures and hood regions of current vehicles. Aerodynamic drag and fuel economy considerations have contributed to the hood being in close proximity to the engine or storage compartment. Accordingly, hood deformation such as that which may occur upon impact of an object, including the head of a pedestrian, onto the hood, and thus the ability of the hood to dissipate impact energy at an appropriate force level and deceleration pulse before bottoming out against hard objects beneath it, is somewhat limited by the contents of the compartment and the spacing of the hood above the objects.

In response, automobile manufacturers have used a number of mechanisms that change the orientation and/or vertical position of the hood with respect to the vehicle before the head of a pedestrian comes into contact with the hood. For example, active hoods may be deployed to increase the space between the hood and the underlying compartment when sensors detect a pedestrian impact at a predetermined velocity. Hood actuators change the orientation of the hood by raising it, in most mechanisms by raising it at a rear edge while maintaining attachment of a front edge to the vehicle structure, i.e., tilting) above the engine compartment. Manufacturers use many types of sensors including accelerometers, fiber optic contact sensors, pressure tubes or a combination of these. An important requirement for all pedestrian sensing systems is to identify a pedestrian impact in a time interval such that a total response time (TRT) defined as a sensing time (ST) plus a deployment time (DT) is less than or equal to a pedestrian "Head Impact Time" (HIT).

The requirement that the TRT be less than or equal to the HIT presents a challenge in taller vehicles, and particularly when a height of a bonnet leading edge (BLE) increases, thereby allowing the pedestrian's head to come in contact with the hood before the hood is fully deployed. This requirement is further challenging when sensing capabilities cannot cover a full width of the vehicle. In addition to meeting GTR-9 (Global Technical Regulations) (or UN ECE R127), and Consumer Metric requirements for a deployable hood system, manufacturers also have their own requirements. These requirements assure that a hood is not deployed when different objects such as birds, small animals, tree branches, garbage cans, large stones and the like contact the front end of the body structure. To meet all of the above requirements, manufacturers place their sensors away from the fascia surface.

There is no presently known system that meets GTR, consumer metrics and manufacturer requirements for the full width of a vehicle that provides a short sensing time so that it can be used in taller vehicles, defined as vehicles having a BLE greater than 760 mm. For instance, known hood systems include a pressure tube, which is embedded in the front bumper foam, spaced away from and behind a bumper fascia and supported against a reaction surface. Because the reaction surface necessary for operation of the pressure tube does not extend for the entire width of the vehicle, known pressure tubes cannot be extended for the entire width of the vehicle and are further limited and dependent on passive safety systems such as foam properties, lower bumper stiffeners, overall fascia stiffness, upper bumper stiffeners, grilles, vehicle height and the multiple constraints, attachments and braces needed to meet modal requirements. Known pressure tubes are also limited to BLE heights of less than 760 mm. In addition, the sensing or response time of known pressure tube systems due to being embedded within the foam of the bumper ranges from approximately 22 msec to 25 msec.

Thus, while current vehicle active hood sensing systems achieve their very limited intended purpose of sensing pedestrian impact along a vehicle longitudinal axis, there is a need for improved sensing capabilities.

SUMMARY

According to several aspects, a method for operating an automobile vehicle pedestrian sensing system includes: fixing at least two piezoelectric sensors to a vehicle bumper fascia; reading an electrical signal defining a voltage signal from each of the at least two piezoelectric sensors, the voltage signal from each of the at least two piezoelectric sensors generated in response to an impact of an object with the fascia; retrieving a predetermined threshold from a memory individually assigned to each of the piezoelectric sensors; and generating a sub-signal indicative of an impact event if the voltage from any of the piezoelectric sensors is greater than the threshold value.

In another aspect of the present disclosure, the method includes forwarding the sub-signal from each of the piezoelectric sensors to at least two logic boxes or circuits.

In another aspect of the present disclosure, the method includes generating a hood deployment signal if any one of the logic circuits receives as inputs sub-signals indicative of the impact event from all of the piezoelectric sensors in communication with the any one of the logic circuits.

In another aspect of the present disclosure, the method includes determining a total response time (TRT) from a sensing time (ST) of the at least two piezoelectric sensors plus a deployment time (DP) for full extension of a vehicle hood using a hood deployment system.

In another aspect of the present disclosure, wherein the TRT is less than or equal to a Head Impact Time (HIT) defining a time between contact between a pedestrian with the fascia until a head of the pedestrian contacts the vehicle hood.

In another aspect of the present disclosure, the method includes returning to the reading step.

In another aspect of the present disclosure, the method includes reading a vehicle speed.

In another aspect of the present disclosure, the method includes calculating a weighting value for the vehicle speed.

In another aspect of the present disclosure, the method includes applying the weighting value to each threshold retrieved from the memory.

In another aspect of the present disclosure, the method includes increasing the weighting value for increasing vehicle speeds up to a maximum speed defining a predetermined speed above which no actuation of a hood deployment system is performed.

According to several aspects, a method for operating an automobile vehicle pedestrian sensing system includes: fixing multiple piezoelectric sensors directly to a vehicle bumper fascia, each generating a voltage in response to an impact of an object with the fascia; retrieving multiple thresholds from a memory, each assigned to one of the sensors; reading the voltage from each of the sensors; determining for each sensor if the voltage is greater than the assigned threshold; creating a sub-signal for each of the voltages determined to be greater than the assigned threshold and forwarding the sub-signal to one of multiple logic boxes or circuits, each of the logic boxes or circuits in communication with at least two of the piezoelectric sensors; and generating a hood deployment signal if any one of the logic boxes or circuits receives the sub-signal from all of the piezoelectric sensors in communication with the any one of the logic boxes or circuits.

In another aspect of the present disclosure, the piezoelectric sensors define piezo-film sensors grouped into a piezo-film sensor array.

In another aspect of the present disclosure, the piezoelectric sensors define piezo-disc sensors grouped into a piezo-disc sensor array.

In another aspect of the present disclosure, the voltage from each of the sensors defines a signal and the signal from each of the sensors is divided into at least two sub-signals.

In another aspect of the present disclosure, at least one of the logic boxes or circuits receives signals from at least three of the sensors.

In another aspect of the present disclosure, the method further includes prior to the determining step: reading a vehicle speed; calculating a weighting value for the vehicle speed; and applying the weighting value to the thresholds retrieved from the memory.

In another aspect of the present disclosure, the method further includes: selecting the piezoelectric sensors as piezo-film sensors; and adhesively bonding the piezoelectric sensors to the fascia.

According to several aspects, a method for operating an automobile vehicle pedestrian sensing system includes: connecting multiple piezoelectric sensors to a rear facing surface of a vehicle bumper fascia, each of the piezoelectric sensors generating a voltage in response to an impact of an object with the fascia; retrieving multiple thresholds from a memory, each assigned to one of the sensors and each predetermined from data distinguishing the object between a pedestrian and a non-pedestrian object; reading the voltage from each of the sensors; dividing the voltage from each of the sensors into at least two sensor signals; determining for each of the sensor signals if the voltage is greater than the assigned threshold; and creating a sub-signal for each of the voltages determined to be greater than the assigned threshold and forwarding the sub-signal to one of multiple logic boxes or circuits, each of the logic boxes or circuits in communication with at least two of the piezoelectric sensors.

In another aspect of the present disclosure, the method includes identifying variations in oscillation modes of the fascia to distinguish two types of fascia impacts: sharp, intense and localized fascia responses define non-deployable hood situations wherein the hood is retained in a closed condition; and global fascia responses across the fascia define deployable hood situations wherein the hood is deployed to a full extension position by the hood deployment system.

In another aspect of the present disclosure, the method includes generating a hood deployment signal when: any one of the logic boxes or circuits receives the sub-signal from all of the piezoelectric sensors in communication with the any one of the logic boxes or circuits; and global fascia responses occur across the fascia.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
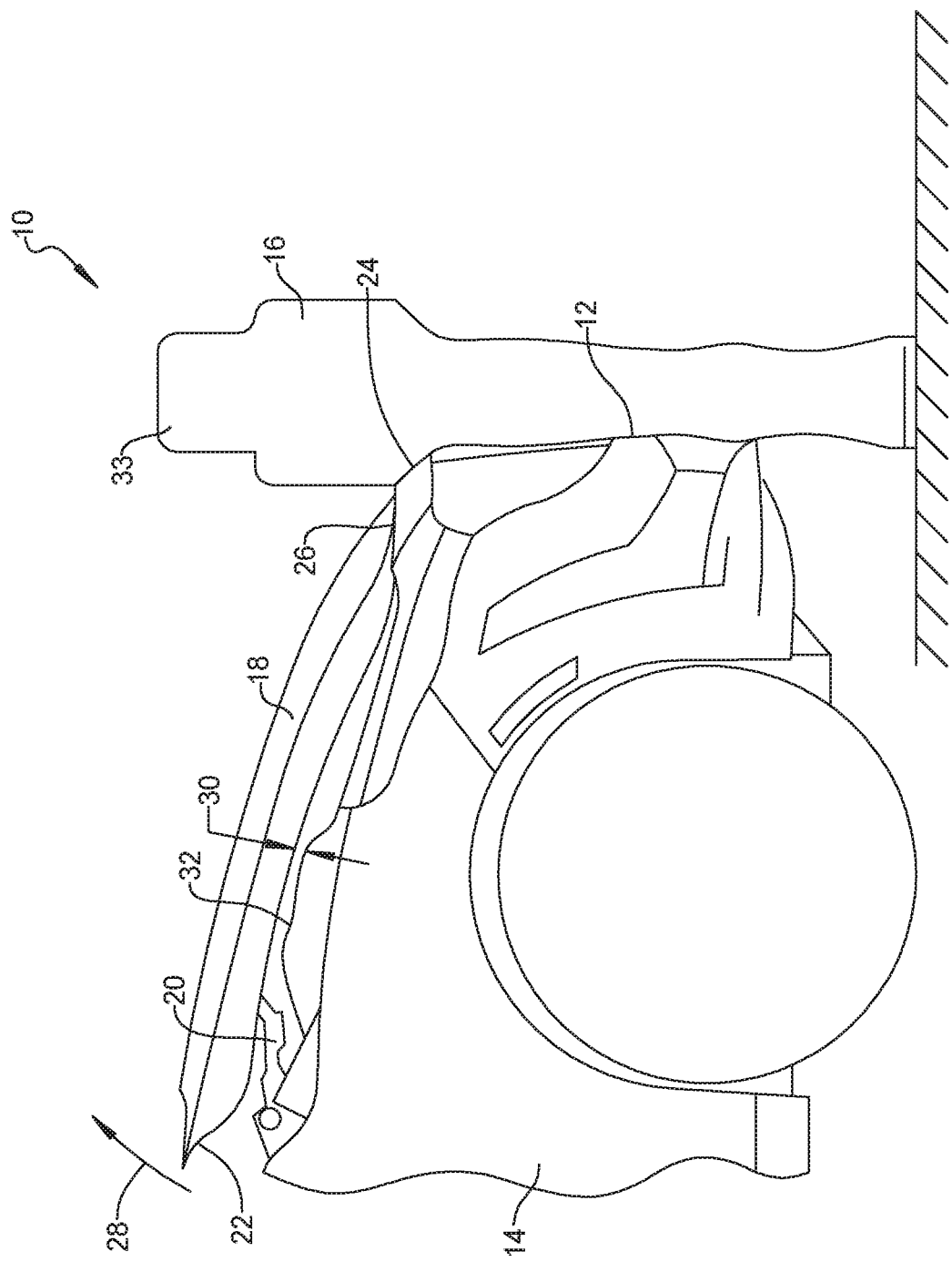
FIG. 1 is a side elevational view of a vehicle having an advanced pedestrian sensing system according to an exemplary embodiment.

Referring to FIG. 1, an advanced pedestrian sensing system and method of operation 10 is provided for detecting and reacting to objects contacting a vehicle bumper beam 12 of a motor vehicle 14. When an object 16 contacting the vehicle bumper beam 12 generates beam acceleration levels that meet or exceed predetermined thresholds, an active vehicle hood 18 is automatically raised by a hood deployment system 20 located proximate to a rear portion 22 of the vehicle hood 18. The vehicle hood 18 is rotatably connected to an upper bumper portion 24 by a hinge 26. Rotation of the vehicle hood 18 about the hinge 26 in an arc of rotation 28 increases a clearance 30 between the vehicle hood 18 and a closest proximate rigid component 32 such as an engine component or a suspension component. The increased clearance 30 mitigates against deflection of the vehicle hood 18 by contact with the object 16 causing contact between the vehicle hood 18 and the rigid component 32, thereby mitigating a force of impact and acceleration at the point of impact between the object 16 and the vehicle hood 18.

Figure 2:
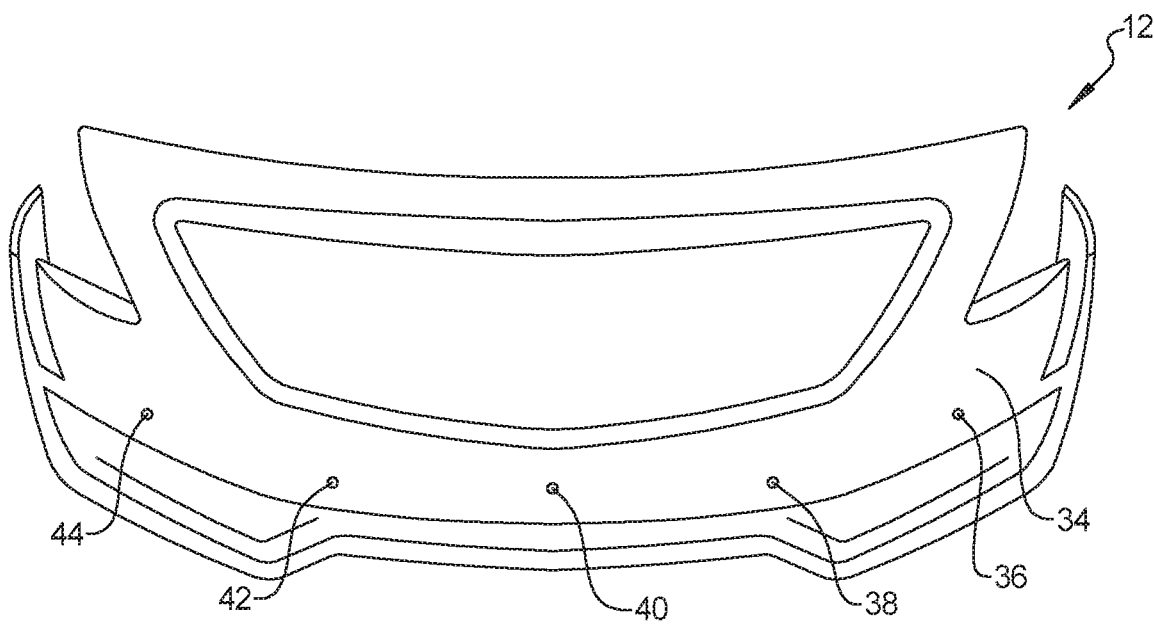
FIG. 2 is a front elevational view of a vehicle fascia having multiple piezo-electric sensors.

A total response time (TRT) of the system can be determined from a sensing time (ST) of the one or more sensors incorporated in the vehicle bumper beam 12 as described in reference to FIG. 2 plus a deployment time (DP) for full extension of the vehicle hood 18 by the hood deployment system 20. The TRT must be less than the Head Impact Time (HIT) described above. The advanced pedestrian sensing system and method of operation 10 is able to maintain the TRT less than the HIT by deploying and locking the vehicle hood 18 using the hood deployment system 20 before the head of a pedestrian, identified as an upper portion 33 of the object 16, contacts the vehicle hood 18.

Referring to FIG. 2 and again to FIG. 1, the vehicle bumper beam 12 of the advanced pedestrian sensing system and method of operation 10 incorporates multiple sensors mounted in direct contact with a rear directed face of a polymeric material fascia 34 covering the vehicle bumper beam 12. A quantity of the sensors required can be a minimum of one sensor, however in an exemplary aspect, the sensors include a first sensor 36 positioned proximate to a bumper left hand side as viewed by a vehicle operator, a second sensor 38 spaced from the first sensor 36, a third sensor 40 positioned substantially in the center of the vehicle bumper beam 12, a fourth sensor 42 spaced to a vehicle operator right hand side of the third sensor, and a fifth sensor 44 positioned proximate to a bumper right hand side. The quantity of five sensors is not limiting, as the advanced pedestrian sensing system and method of operation 10 can function with as few as one sensor, or more than five sensors.

Figure 3:
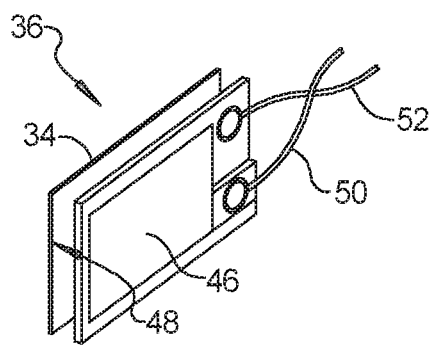
FIG. 3 is a front perspective view of an exemplary piezo-film sensor.

Referring to FIG. 3 and again to FIGS. 1 and 2, according to several aspects each of the sensors such as the exemplary first sensor 36 shown defines a piezoelectric-film sensor such as a piezoelectric polyvinylidene difluoride "PVDF" sensor 46. The PVDF sensor 46 is a thin, generally rectangular-shaped film fixed to a rear facing side 48 of the fascia 34 for example using an adhesive such as a room temperature vulcanization (RTV) silicone adhesive. The PVDF sensor 46 directly contacts the fascia 34 and is positioned forward of the compressible foam normally positioned between a stiff reaction surface of the vehicle bumper and the fascia 34. Any deflection of the fascia 34 is therefore directly sensed and indicated by the PVDF sensor 46. Electrical leads 50, 52 extend from the opposed faces of the PVDF sensor 46. Each of the sensors including the PVDF sensor 46 self-generate an electrical signal or voltage by elastic deformation of the PVDF sensor 46 for example when the object 16 physically contacts the forward directed face of the fascia 34. The signal output from each PVDF sensor is forwarded to a vehicle control or processing unit described in reference to FIG. 7. PVDF sensors such as the PVDF sensor 46 provide an enhanced response time ranging between approximately 8 msec to 10 msec, compared to a response time ranging between approximately 22 to 25 msec for known pressure tube systems.

Figure 4:
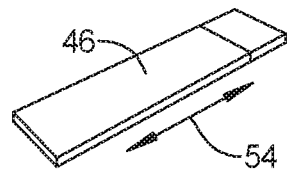
FIG. 4 is a top perspective view of the piezo-film sensor of FIG. 3 acted upon by a longitudinal force.
Figure 5:
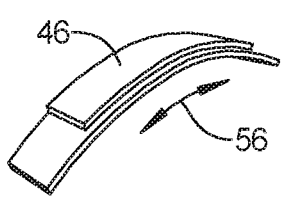
FIG. 5 is a side perspective view of the piezo-film sensor of FIG. 3 acted upon by a bending force.
Figure 6:
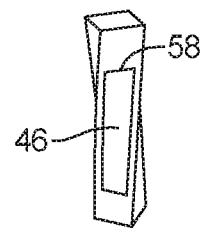
FIG. 6 is a front perspective view of the piezo-film sensor of FIG. 3 acted upon by a torsional force.

Referring to FIGS. 4, 5 and 6 each of the sensors such as the PVDF sensor 46 generate an electrical voltage proportional to displacement in a longitudinal direction 54 as shown in FIG. 4, when deflected such as by a bending motion 56 shown in FIG. 5, or when deflected such as by a torsional motion 58 as shown in FIG. 6. Acceleration motion of the fascia 34 due to energy imparted from an impact of the object 16 at any location on the fascia 34 can be detected at any one or all of the sensors including the exemplary first sensor 36, the second sensor 38, the third sensor 40, the fourth sensor 42 and the fifth sensor 44. The energy or acceleration motion is converted to electrical voltages by the sensors, and the electrical voltages are each evaluated against known impact criteria to establish signal thresholds which distinguish what the object 16 may be, such as for example a pedestrian, or a non-pedestrian object such as a small animal, a stone, a ball, or the like.

Referring to FIG. 7 and again to FIGS. 1 through 6, the first sensor 36, the second sensor 38, the third sensor 40, the fourth sensor 42 and the fifth sensor 44 together define a piezo-film sensor array 60. The output voltages from each of the sensors in the piezo-film sensor array 60 are forwarded to a processing unit 62 such as an engine control unit (ECU) which reads all sensor data, provides signal conditioning, applies predetermined thresholds to each voltage, and determines using one or more algorithms if actuation of the hood deployment system 20 is required. The processing unit 62 includes a memory 63 wherein threshold data for each of the sensors is stored.

Figure 7:
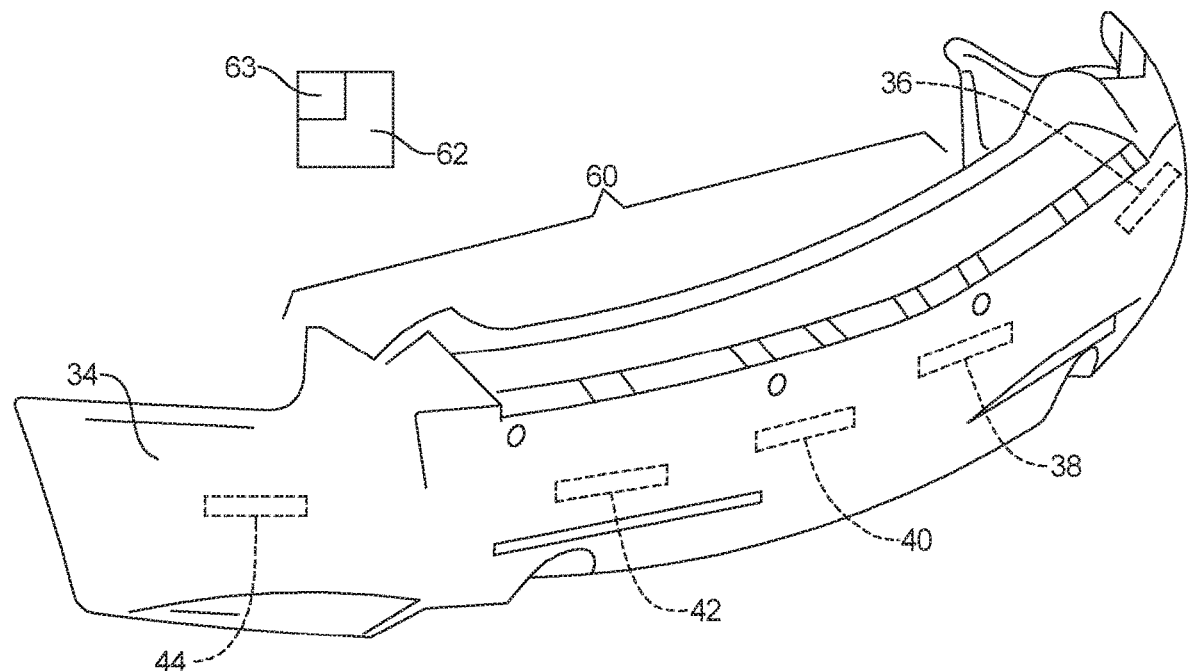
FIG. 7 is a front right perspective view of a vehicle fascia having multiple embedded piezo-film sensors.
Figure 8:
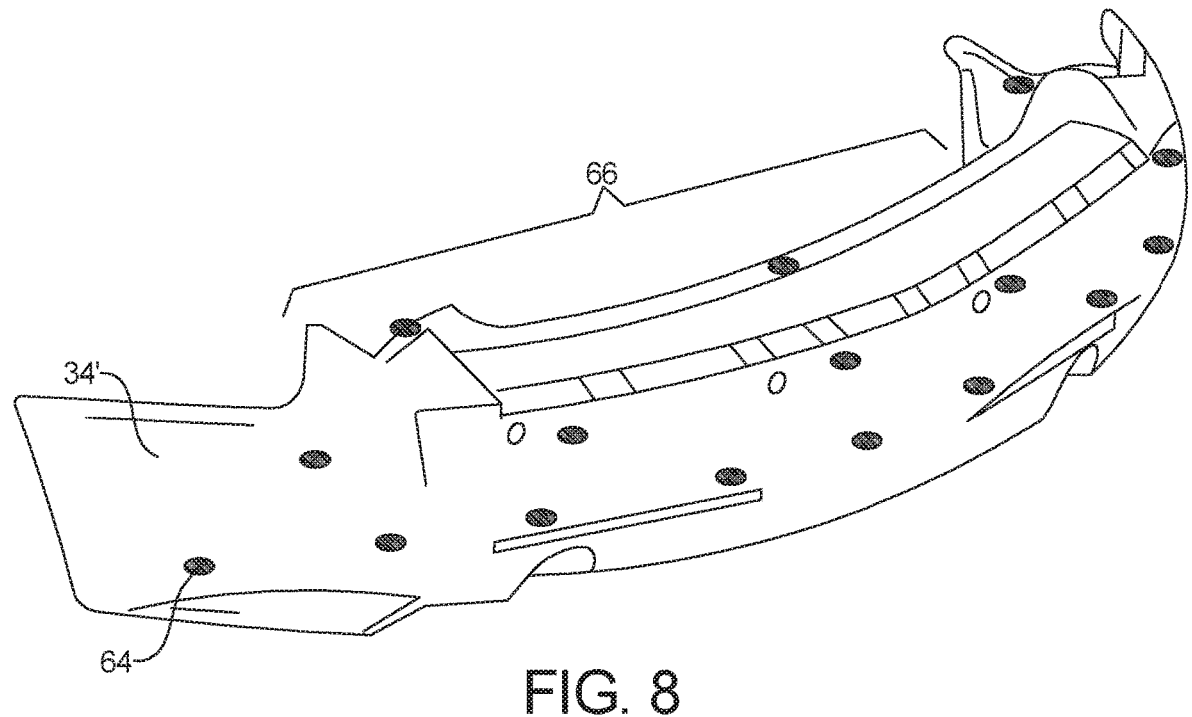
FIG. 8 is a front right perspective view of a vehicle fascia having multiple embedded piezo-disc sensors.

Referring to FIG. 8 and again to FIG. 7, according to several aspects in lieu of piezo-film sensors, one or more piezo-electric disc sensors 64 can be mounted to the fascia 34', defining a piezo-disc sensor array 66. The piezo-disc sensor array 66 is similarly mounted to a fascia and functions similarly to the piezo-film sensor array 60.

Referring to FIG. 9 and again to FIGS. 1 and 7, according to several aspects a flow chart 68 is used to identify when deployment or actuation of the hood deployment system 20 is required. An algorithm defined by the flow chart 68 continuously functions in the processing unit 62 during vehicle operation and starts at a time 70. In a first step 72 all of the sensor data from each of the sensors in the sensor array is read such as the first sensor 36, the second sensor 38, the third sensor 40, the fourth sensor 42 and the fifth sensor 44 is read. In a second step 74 signal conditioning is performed including attenuation as required and signal filtering. The algorithm provides for connections from all sensors to all logical boxes or circuits but during calibration some sensor outputs are not necessary for decision making and are not used and are therefore not shown in FIG. 10 described in greater detail below.

Following signal conditioning, predetermined threshold values are applied to specific ones of the sensor voltages to create sub-signals which are forwarded to multiple logic boxes or circuits which perform decision logic in parallel. The threshold values are predetermined from vehicle bumper impact test data and may vary between different vehicle models. The number of logic boxes or circuits is not limiting and can vary between different vehicle models. The sub-signals output from individual ones of the sensors after application of the threshold values are assigned to the different logic boxes or circuits as described in reference to FIG. 10, wherein the logic boxes or circuits receive and analyze the output of at least one of the sensors. For example, the sensor voltage from the center located sensor, the third sensor 40 positioned substantially in the center of the vehicle bumper beam 12, can be provided to any one, only one or all of the logic boxes or circuits.

In the example provided, in a first logic box 76 the output voltages from each of the five sensors 36, 38, 40, 42, 44 is individually compared to a predetermined individual threshold value for each of the five sensors 36, 38, 40, 42, 44 to generate a sub-signal for each sensor. The threshold values are predetermined from test data conducted by impact analyses of individual bumper designs for individual vehicle models by multiple different types of objects and saved in the memory 63 of the processing unit 62. The threshold values help distinguish the reaction of the fascia 34 when contacted by a certain object such as a pedestrian from other non-pedestrian objects, and thereby discriminate a hood deployment event from non-hood deployment events. In the non-limiting example provided, in the first logic box 76 the output voltage from the first sensor 36 is compared to a first sensor threshold value. The output voltage from the second sensor 38 is compared to a second sensor threshold value. The output voltage from the third sensor 40 is compared to a third sensor threshold value. The output voltage from the fourth sensor 42 is compared to a fourth sensor threshold value. The output voltage from the fifth sensor 44 is compared to a fifth sensor threshold value.

Similarly, in an exemplary second logic box 78 the sensor voltages from the center located sensor, the third sensor 40, and the sensor voltages from the two closest sensors to the center located sensor, the second sensor 38 and the fourth sensor 42 are each compared to individual threshold values for impact to the right side of the fascia 34. In a third logic box 80 the sensor voltages from the center located sensor, the third sensor 40, and the sensor voltages from the two farthest sensors from the center located sensor, the first sensor 36 and the fifth sensor 44 are each compared to individual threshold values for impact to the far right side of the fascia 34. In a fourth logic box 82 the sensor voltages from the center located sensor, the third sensor 40, and the sensor voltages from the two closest sensors to the center located sensor, the second sensor 38 and the fourth sensor 42 are each compared to individual threshold values for impact to the left side of the fascia 34. In a fifth logic box 84 the sensor voltages from the center located sensor, the third sensor 40, and the sensor voltages from the two farthest sensors from the center located sensor, the first sensor 36 and the fifth sensor 44 are each compared to individual threshold values for impact to the far left side of the fascia 34. It is noted the above combinations of sensors can be varied for any of the logic boxes or circuits within the scope of the present disclosure.

In each of the logic boxes or circuits, it is determined if each sensor voltage is greater than each predetermined threshold value for the particular sensor. If any one or more of the sensor voltage values is less than the compared threshold value a negative response 86 is generated for that logic box and the algorithm 68 returns to the first step 72 wherein all of the sensor data from all of the sensors such as the first sensor 36, the second sensor 38, the third sensor 40, the fourth sensor 42 and the fifth sensor 44 is read. In each of the logic boxes or circuits, if each sensor voltage value is greater than the compared threshold value for each particular sensor, a positive signal is sent to a deployment block 88. If the output from any one of the logic boxes or circuits results in a positive signal, a hood deployment system deploy signal is generated by the deployment block 88.

Referring to FIG. 10 and again to FIGS. 1 through 9, the algorithm defined by the flow chart 68 can be modified in multiple different ways, for example using an algorithm defined by a flow chart 90 by dividing the signals output from each of the sensors into multiple output signals and incorporating the different threshold values for the individual sensor signals, and assigning this output into different logic boxes or circuits to identify when deployment or actuation of the hood deployment system 20 is required. The operations performed by the algorithm defined in the flow chart 90 continuously function in the processing unit 62 during vehicle operation and start at a first step 92 similar to the first step 70 where all of the sensor data from at least each of the sensors such as the first sensor 36, the second sensor 38, the fourth sensor 42, and the fifth sensor 44 is read. Signal conditioning is also performed in the first step 92 including attenuation as required and signal filtering.

Following signal conditioning, predetermined threshold values are retrieved from the memory 63 in the processing unit 62 and are applied to specific ones of the sensor voltages and applied in multiple logic boxes or circuits which are configured in parallel. For example, a first signal 94 is generated by the first sensor 36, a second signal 96 is generated by the second sensor 38, a third signal 98 is generated by the fourth sensor 42 and a fourth signal 100 is generated by the fifth sensor 44. Each of the signals may be divided into two or more sub-signals to which a threshold is applied. In the present example, the first signal 94 is divided and may generate two sub-signals. The first signal 94 compared to a first threshold 102 and if the first signal 94 exceeds the first threshold 102 a first sub-signal 104 is generated and forwarded to a first logic box 106. The first signal 94 is also compared to a second threshold 108 and if the first signal 94 exceeds the second threshold 108 a second sub-signal 110 is generated and forwarded to each of a second logic box 112 and a third logic box 114. The first threshold 102 may by equal to the second threshold 108 or may be different. Similarly, the thresholds discussed below can be equal to each other or different.

In the present example, the second signal 96 is divided and may generate three sub-signals. The second signal 96 is compared to each of a third threshold 116, a fourth threshold 118 and a fifth threshold 120. If the second signal 96 exceeds the third threshold 116, a third sub-signal 122 is generated and forwarded to the second logic box 112. If the second signal 96 exceeds the fourth threshold 118, a fourth sub-signal 124 is generated and forwarded to the third logic box 114. If the second signal 96 exceeds the fifth threshold 120, a fifth sub-signal 126 is generated and forwarded to each of the first logic box 106 and a fourth logic box 128.

In the present example, the third signal 98 is divided and may generate two sub-signals. The third signal 98 is compared to each of a sixth threshold 130 and a seventh threshold 132. If the third signal 98 exceeds the sixth threshold 130, a sixth sub-signal 134 is generated and forwarded to each of the first logic box 106 and the third logic box 114. If the third signal 98 exceeds the seventh threshold 132, a seventh sub-signal 136 is generated and forwarded to each of the second logic box 112, the fourth logic box 128, and a fifth logic box 138.

In the present example, the fourth signal 100 is divided and may generate two sub-signals. The fourth signal 100 is compared to each of an eighth threshold 140 and a ninth threshold 142. If the fourth signal 100 exceeds the eighth threshold 140, an eighth sub-signal 144 is generated and forwarded to each of the third logic box 114 and the fourth logic box 128. If the fourth signal 100 exceeds the ninth threshold 142, a ninth sub-signal 146 is generated and forwarded to the fifth logic box 138.

A determination is made in the first logic box 106 if all of the first sub-signal 104, the fifth sub-signal 126 and the sixth sub-signal 134 are received by the first logic box 106. If yes, a first actuate signal 148 is forwarded to a decision box 150. Similarly, if all of the second sub-signal 110, the third sub-signal 122 and the seventh sub-signal 136 are received by the second logic box 112 a second actuate signal 152 is forwarded to the decision box 150. If all of the second sub-signal 110, the fourth sub-signal 124, the sixth sub-signal 134 and the eighth sub-signal 144 are received by the third logic box 114 a third actuate signal 154 is forwarded to the decision box 150. If all of the fifth sub-signal 126, the seventh sub-signal 136 and the eighth sub-signal 144 are received by the fourth logic box 128 a fourth actuate signal 156 is forwarded to the decision box 150. If all of the seventh sub-signal 136 and the ninth sub-signal 146 are received by the fifth logic box 138 a fifth actuate signal 158 is forwarded to the decision box 150.

It is noted the above groupings of sub-signals with different threshold values can be assigned to different ones of the logic boxes or circuits for different vehicle models within the scope of the present disclosure. In this way the deflection characteristics of different vehicle fascia and bumpers can be accommodated using the advanced pedestrian sensing system and method of operation 10 of the present disclosure to provide positive actuation of the hood deployment system 20 while avoiding non-deployment load cases.

If the actuate signal generated from any one of the first logic box 106, the second logic box 112, the third logic box 114, the fourth logic box 128 or the fifth logic box 138 is received by the decision box 150, a hood deployment system deploy signal 160 is generated and forwarded to the hood deployment system 20. It is noted multiple similar algorithms can be used, each having different quantities of sensors, different threshold values and different quantities of logic boxes or circuits, with different ones of the threshold values and sub-signals applied in different ones of the logic boxes or circuits.

The exemplary algorithms discussed above permit the advanced pedestrian sensing system and method of operation 10 to determine if the voltages received from different piezoelectric sensors mounted on the bumper fascia conform to an acceleration which can be distinguished for a particular fascia between a sharp, intense and localized response of a hood non-deployment load case versus a relatively smooth, moderate and global response across the fascia representing a hood deployable load case. The vehicle fascia is designed to meet certain frequency and stiffness requirements and therefore each vehicle fascia may vary in mass and attachment to the vehicle body. The fascia response to different types of impacts and loading therefore varies significantly. These variations are advantageously accommodated by identifying piezoelectric sensor types and their arrangement for each particular vehicle.

Figure 9:
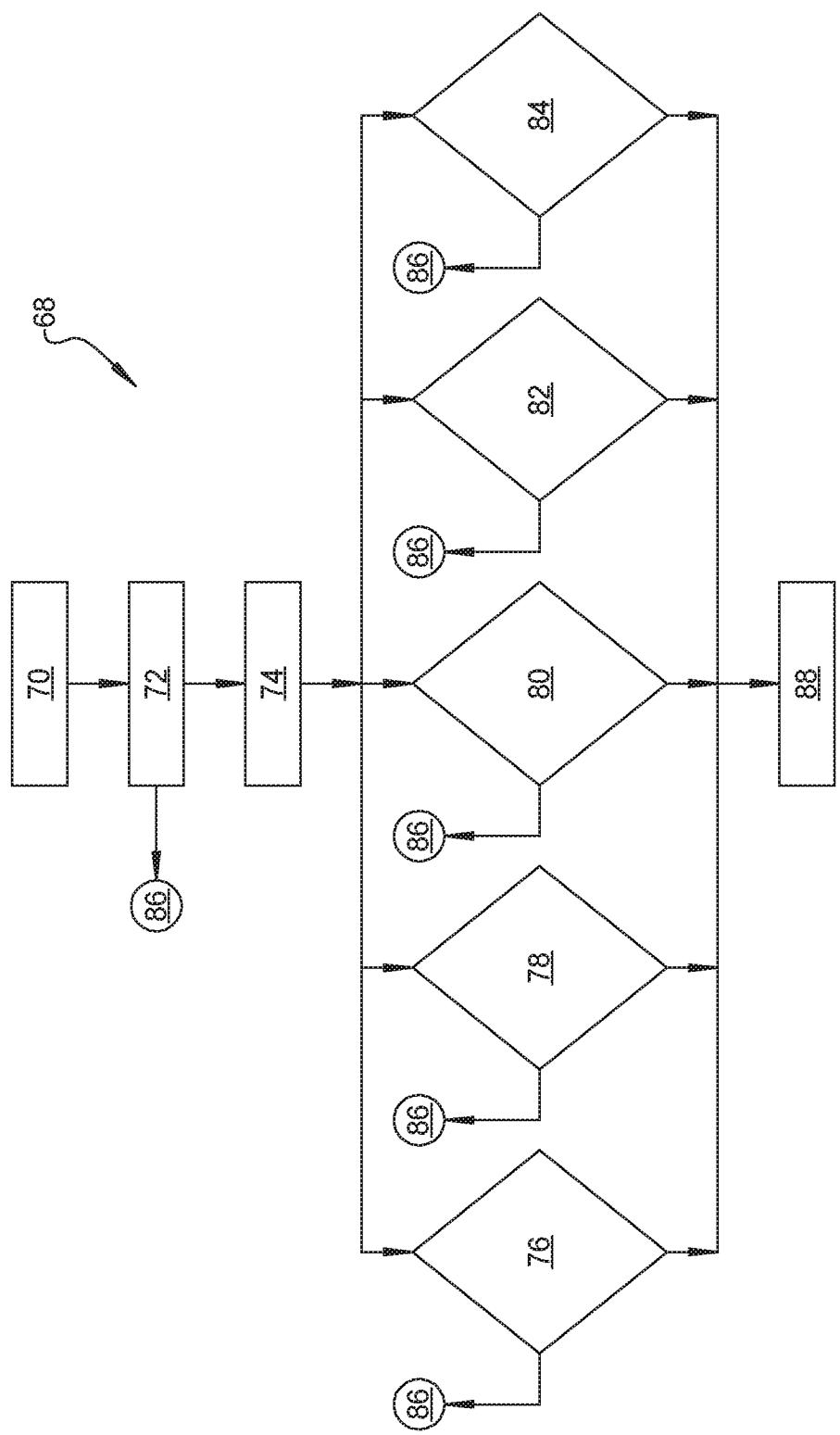
FIG. 9 is a flow diagram of a first algorithm for the advanced pedestrian sensing system of the present disclosure.
Figure 10:
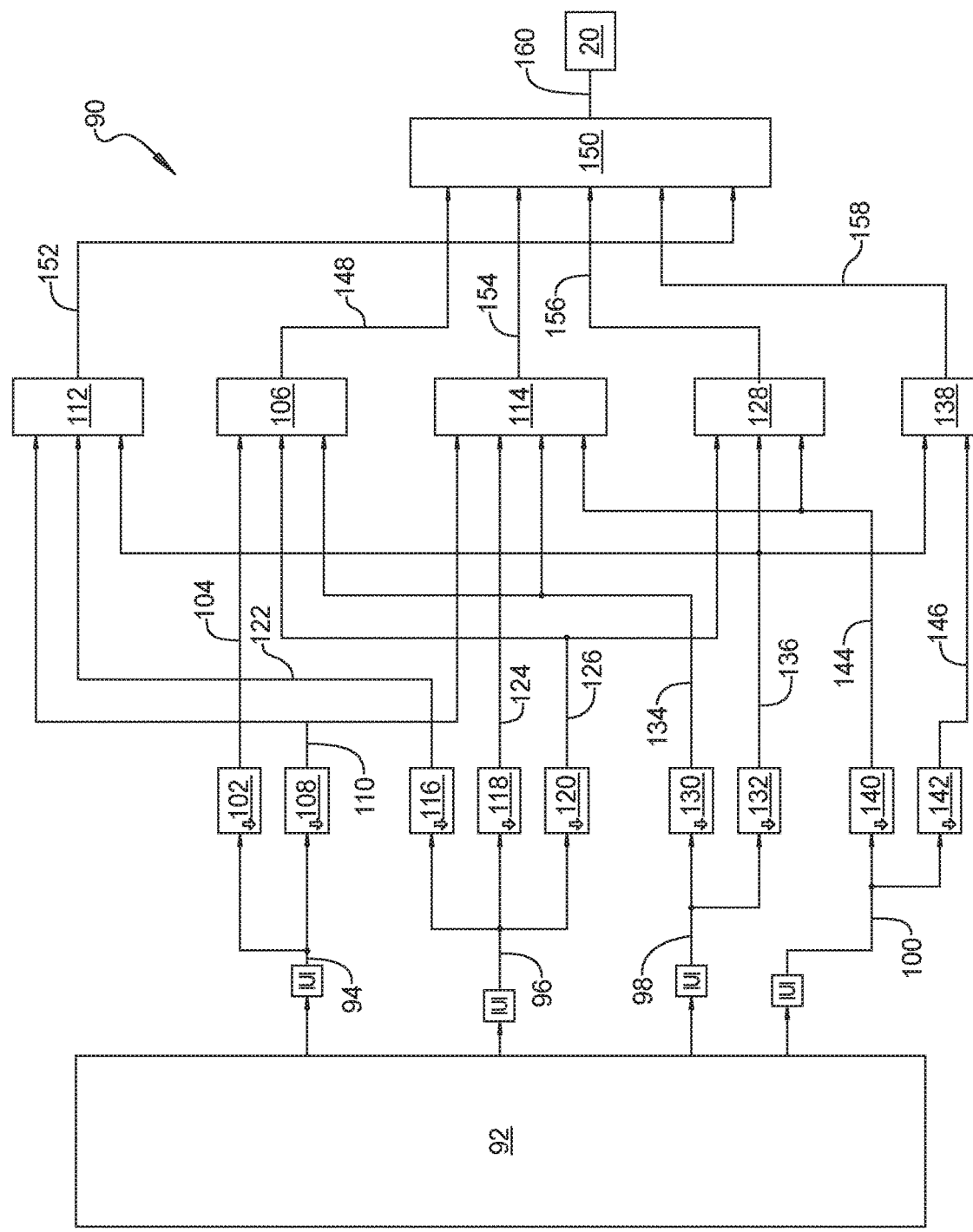
FIG. 10 is a schematic of logic paths for another algorithm of the present disclosure.
Figure 11:
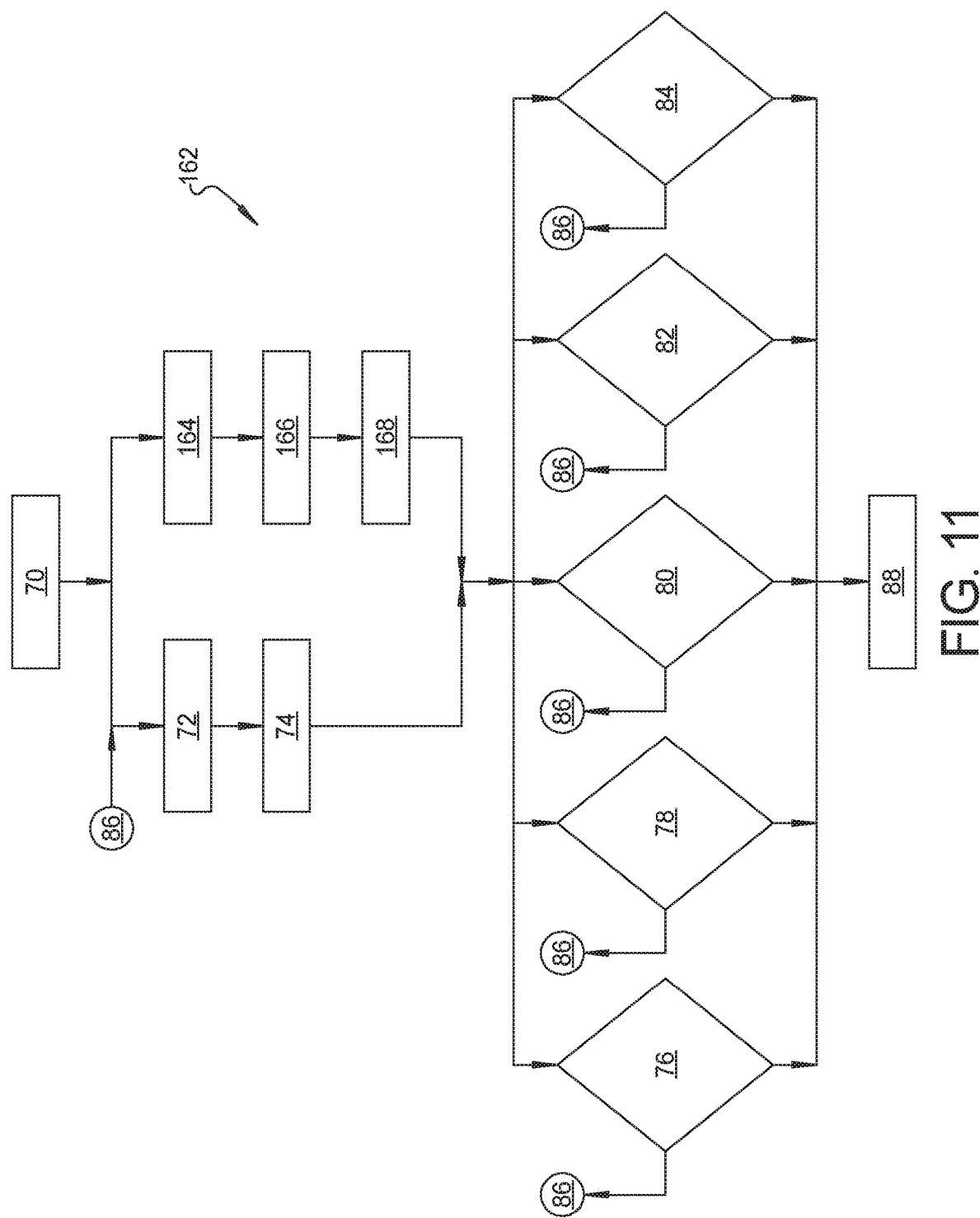
FIG. 11 is a flow diagram of a second algorithm for the advanced pedestrian sensing system of the present disclosure.

Referring to FIG. 11 and again to FIG. 9, according to further aspects, an algorithm flow chart 162 is modified from the algorithm flow chart 68 by further incorporation of a vehicle speed. Only the differences from the algorithm flow chart 68 will therefore be further described. In steps conducted in parallel with the first step 72 and the second step 74, a vehicle speed is read in a step 164. Weighting values are then calculated for the vehicle speed in a step 166. In a step 168 the weighting values from step 166 are then applied to the thresholds saved in the memory 63 in the processing unit 62. For example, at higher vehicle speeds up to a maximum speed the weighting values increase, and the weighting values decrease with decreasing vehicle speed. For example a maximum speed may be predetermined to be 50 kilometers per hour, above which no actuation of the hood deployment system 20 is performed.

Referring to FIG. 12 and again to FIGS. 1 through 2, according to further aspects, a graph 170 demonstrates how sensor data collected for events such as a stone contacting the fascia 34 can be used to discriminate the stone strike event as one of the non-deployment load cases. The graph 170 identifies a voltage 172 defining an output voltage from different ones of the vehicle fascia mounted piezo-sensors compared over a time 174 in milliseconds. A first curve 176 for one of the five sensors identifies a rapid peak voltage 178 of approximately 103 volts occurs at approximately 4 milliseconds. A second curve 180 identifies a peak voltage 182 of approximately 12 volts occurs at approximately 6 seconds. The remaining curves of the other three sensors indicate that no response exceeds approximately 10 volts. The stone impact therefore causes a first one of the sensors proximate to the stone strike to respond with a rapid and high output voltage, but results in almost no sensor response from the remaining four sensors spaced away from the first one of the sensors. Threshold values can therefore be predetermined from this data.

For example, the threshold values can be set such that if the highest indicating peak voltage from any sensor is greater than 30 Volts and a difference between the highest peak voltage and a second or next highest peak voltage from a different sensor is greater than 70%, it is unnecessary for the hood deployment system 20 to deploy. A stone strike could result in a hood deployment for example if the highest indicating peak voltage is greater than 30 Volts and a difference between the highest peak voltage and a second or next highest peak voltage is less than 70%. In the example provided in the graph 170, [the highest peak voltage (103 volts) minus the next highest peak voltage (12 volts)]÷103=88%. Because the difference of 88% between the highest peak voltage and the second or next highest peak voltage from a different sensor is greater than 70%, it is unnecessary for the hood deployment system 20 to deploy.

Figure 12:
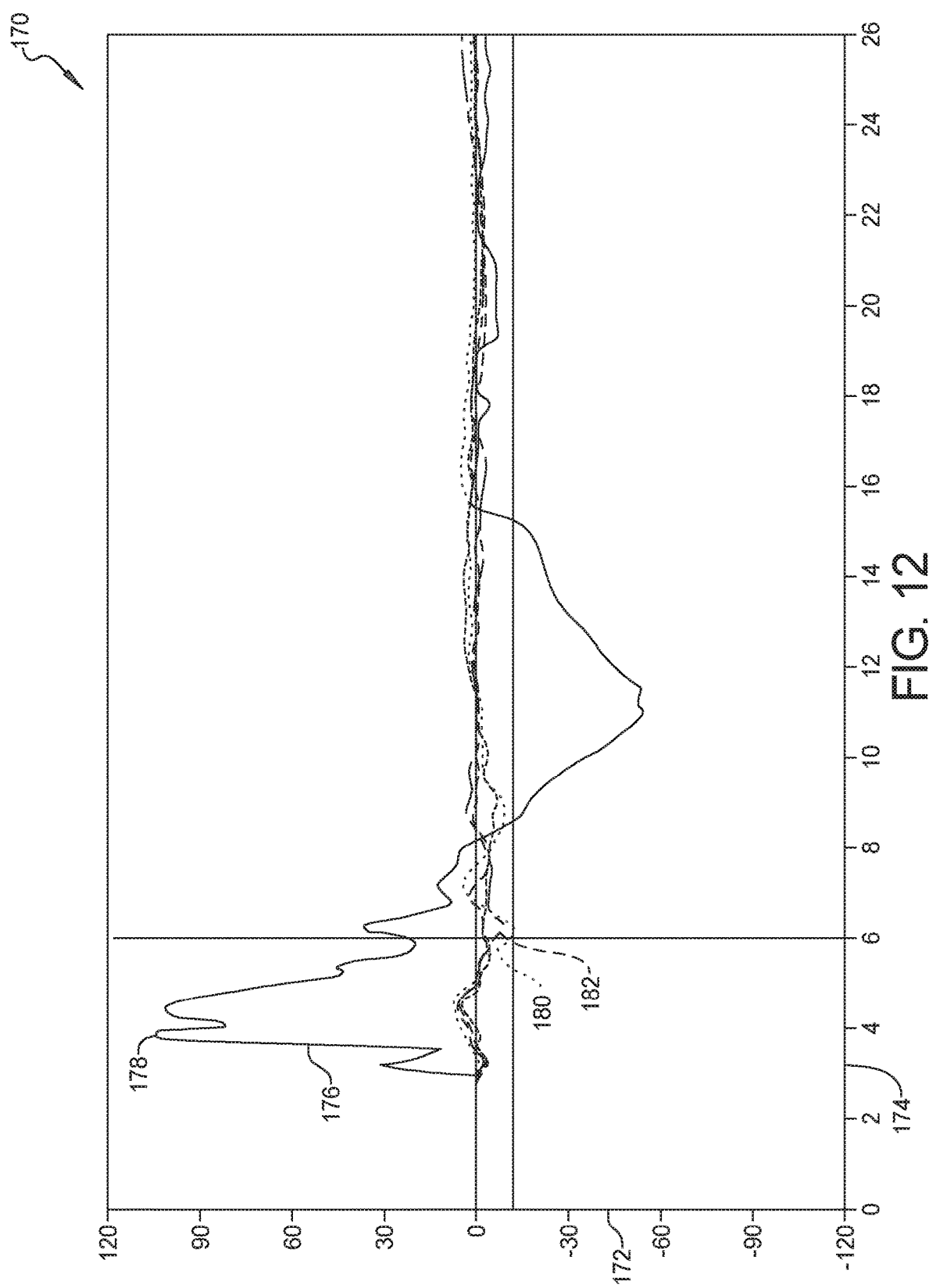
FIG. 12 is a graph depicting sensor responses to a stone impact.
Figure 13:
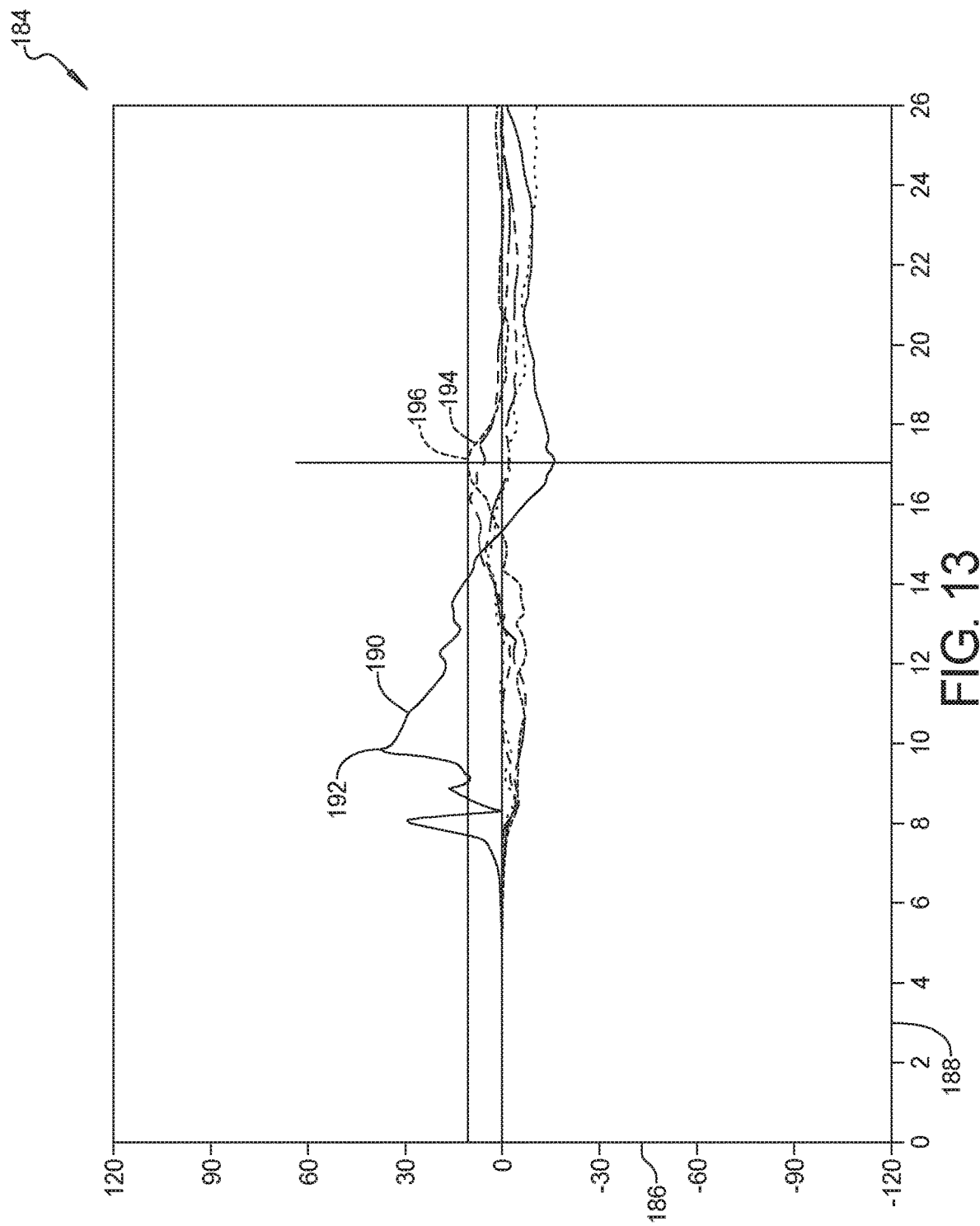
FIG. 13 is a graph depicting sensor responses to a pedestrian impact.

Referring to FIG. 13 and again to FIG. 12, according to further aspects, a graph 184 demonstrates how sensor data collected for events such as pedestrian contact with the fascia 34 can be used to discriminate a pedestrian strike event as one of the deployment load cases. The graph 184 identifies a voltage 186 defining an output voltage from different ones of the vehicle fascia mounted piezo-sensors compared over a time 188 in milliseconds. A first curve 190 for one of the five sensors identifies a peak voltage 192 of approximately 36 volts occurs at approximately 10 milliseconds. A second curve 194 identifies a peak voltage 196 of approximately 11 volts occurs at approximately 17 seconds. The remaining curves of the other three sensors indicate that no response exceeds approximately 11 volts. In the example provided in the graph 184, [the highest peak voltage (36 volts) minus the next highest peak voltage (11 volts)]÷36=69%. Because the difference of 69% between the highest peak voltage and the second or next highest peak voltage from a different sensor is less than 70%, a pedestrian strike event is indicated and a deployment signal can be generated to actuate the hood deployment system 20.

The graphs 170, 184 demonstrate that the advanced pedestrian sensing system and method of operation 10 does not initiate hood deployment due to a maximum sensor voltage from a single sensor. In contrast, the advanced pedestrian sensing system and method of operation 10 evaluates a pattern of fascia acceleration using the output from multiple sensors input into one or more algorithms which apply threshold values to the sensor output of each sensor, with hood deployment initiated in response to predetermined criteria defining a hood deployment event.

An advanced pedestrian sensing system of the present disclosure offers several advantages. These include the use of a pattern of sensors mounted onto the fascia of the vehicle front bumper and a processing algorithm that covers the entire front of the vehicle and provides rapid sensing of pedestrian impact events. Using piezoelectric sensors with high sensitivity provides rapid response times ranging between approximately 8 msec to 10 msec, allowing the processing algorithm to make rapid decisions in discriminating deployable events such as contact with a pedestrian, versus nondeployable events which include contact with non-pedestrian objects including but not limited to birds, small animals, stones, shopping carts, balls, garbage cans, sign posts, and the like. The advanced pedestrian sensing system of the present disclosure takes advantage of variations and sensitivities in load and oscillation modes of the vehicle fascia to identify various types of impacts. Using combinations of signals from various sensors allows discrimination between the sharp, intense and localized responses indicative of non-deployable load cases that significantly impact only one or two adjacent sensors from the relatively smooth, global responses across the fascia indicative of deployable load cases that impact more sensors and more significantly. Because of the enhanced sensing speed provided by the use of piezoelectric sensors directly attached or fixed to the fascia, the advanced pedestrian sensing system of the present disclosure can be used in taller vehicles, defined as vehicles having a BLE greater than 760 mm.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for operating an automobile vehicle pedestrian sensing system, comprising:
    fixing at least two piezoelectric sensors to a vehicle bumper fascia;
    reading an electrical signal defining a voltage signal from each of the at least two piezoelectric sensors, the voltage signal from each of the at least two piezoelectric sensors generated in response to an impact of an object with the fascia;
    retrieving a predetermined threshold from a memory individually assigned to each of the piezoelectric sensors;
    generating a sub-signal indicative of an impact event if the voltage from any of the piezoelectric sensors is greater than the threshold value;
    determining a total response time (TRT) from a sensing time (ST) of the at least two piezoelectric sensors plus a deployment time (DP) for full extension of a vehicle hood using a hood deployment system, wherein the TRT is less than or equal to a Head Impact Time (HIT) defining a time between contact between a pedestrian with the fascia until a head of the pedestrian contacts the vehicle hood.

2. The method for operating an automobile vehicle pedestrian sensing system of claim 1, further including forwarding the sub-signal from each of the piezoelectric sensors to at least two logic boxes or circuits.

3. The method for operating an automobile vehicle pedestrian sensing system of claim 2, further including generating a hood deployment signal if any one of the logic circuits receives as inputs sub-signals indicative of the impact event from all of the piezoelectric sensors in communication with the any one of the logic circuits.

4. The method for operating an automobile vehicle pedestrian sensing system of claim 1, further including returning to the reading step.

5. The method for operating an automobile vehicle pedestrian sensing system of claim 1, further including reading a vehicle speed.

6. The method for operating an automobile vehicle pedestrian sensing system of claim 5, further including calculating a weighting value for the vehicle speed.

7. The method for operating an automobile vehicle pedestrian sensing system of claim 6, further including applying the weighting value to each threshold retrieved from the memory.

8. A method for operating an automobile vehicle pedestrian sensing system, comprising:
    fixing at least two piezoelectric sensors to a vehicle bumper fascia;
    reading an electrical signal defining a voltage signal from each of the at least two piezoelectric sensors, the voltage signal from each of the at least two piezoelectric sensors generated in response to an impact of an object with the fascia;
    retrieving a predetermined threshold from a memory individually assigned to each of the piezoelectric sensors;
    generating a sub-signal indicative of an impact event if the voltage from any of the piezoelectric sensors is greater than the threshold value;
    reading a vehicle speed;
    calculating a weighting value for the vehicle speed;
    applying the weighting value to each threshold retrieved from the memory; and
    increasing the weighting value for increasing vehicle speeds up to a maximum speed defining a predetermined speed above which no actuation of a hood deployment system is performed.

* * * * *